Figure 1:
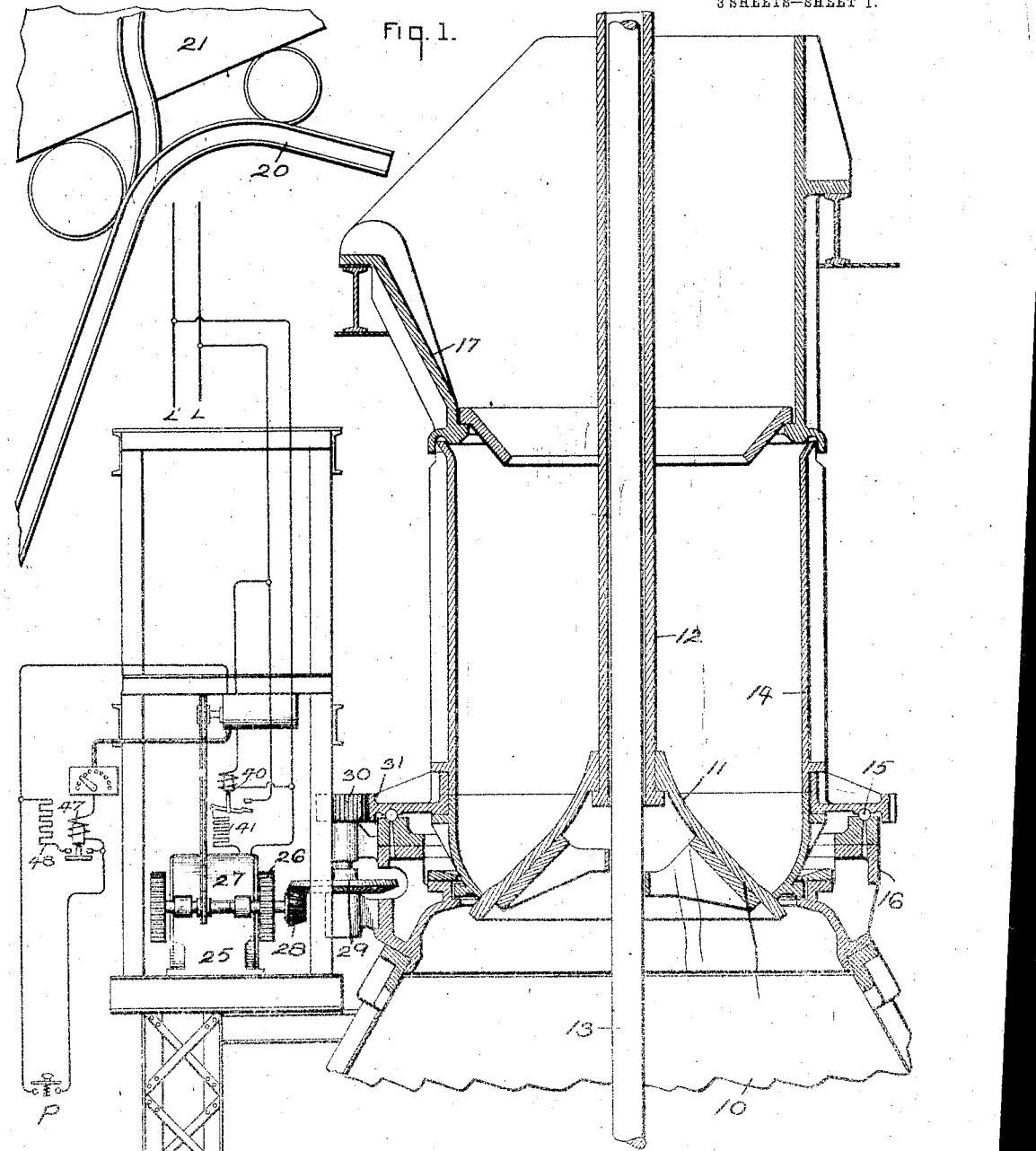

W. NAUMANN.
MOTOR CONTROL SYSTEM.
APPLICATION FILED MAR. 3, 1908.

927,426.

Patented July 6, 1909.
3 SHEETS—SHEET 2.

WITNESSES
M. R. Taylor
J. Ellis Glen

INVENTOR.
WILHELM NAUMANN

ATTY.

W. NAUMANN.
MOTOR CONTROL SYSTEM.
APPLICATION FILED MAR. 3, 1908.

927,426.

Patented July 6, 1909.
3 SHEETS—SHEET 3.

Alternate Movements $\begin{cases} x-y \\ x+y \end{cases}$

Alternate Movements $\begin{cases} 3x-y \\ y-x \end{cases}$

WITNESSES

INVENTOR
WILHELM NAUMANN
by
ATTY.

UNITED STATES PATENT OFFICE.

WILHELM NAUMANN, OF BERLIN, GERMANY, ASSIGNOR TO GENERAL ELECTRIC COMPANY, A CORPORATION OF NEW YORK.

MOTOR-CONTROL SYSTEM.

No. 927,426.

Specification of Letters Patent.

Patented July 6, 1909.

Application filed March 3, 1908. Serial No. 418,971.

*To all whom it may concern:*

Be it known that I, WILHELM NAUMANN, subject of the King of Prussia, residing at Berlin, Germany, have invented certain new and useful Improvements in Motor-Control Systems, of which the following is a specification.

My invention relates to motor control systems, and particularly to the control of an electric motor used in connection with a receptacle arranged to receive material in instalments, to so move the receptacle and the points of delivery of the material with reference to one another that the material will be evenly distributed in said receptacle.

It is an object of my invention to provide a system of control for a motor used for this purpose such that the movement of the receptacle and the point of delivery of the material with reference to one another may be easily, and to a large extent, automatically controlled, even though the total amount of material is delivered to the receptacle in instalments, the number of which is varied from time to time. In other words, it is an object of my invention to so control a motor under these conditions as to insure the even distribution of material in the receptacle no matter in how many instalments (within certain limits) it may be supplied.

Although I realize that my invention may be used for other purposes, it is particularly adapted for, and I have described it as used in connection with the charging of blast furnaces. In this connection my invention has for its object the proper control of the motor by which the hopper, into which the charge is first dumped, is rotated.

As is well known, in the operation of blast furnaces the material with which the furnace is charged is usually conveyed to the top of the furnace by either one or two conveyers or hoists, these being arranged to dump into the hopper at the top of the furnace. In order that the loads of material brought up by the hoists may be evenly distributed around the hopper, the latter is arranged for rotation, being often driven by an electric motor. At the bottom of this hopper is the upper or little "bell" which can be lowered to allow the charge to fall onto the large "bell" in a manner well understood. Since the number of hoist loads which make up a charge may be varied from time to time, the angle between the loads in the hopper is different at different times and the control of the motor which drives the hopper has been difficult. For example, if the charge consists of six hoist loads these loads will be distributed in the hopper at angles of 60° from one another, while if the charge comprises ten loads the angle between the loads will be 36°, providing the charge is equally distributed around the hopper. The difficulty of equally distributing the loads in the hopper is further increased when, as is often the case, two hoists are used, these being arranged to alternately empty a load into the hopper. Under this condition it may be necessary to rotate the hopper not intermittently through the same angle but instead through different angles.

By my invention I provide means for starting and automatically stopping the motor and thereby causing it to rotate the hopper intermittently, and for regulating the automatic stopping of the motor for different numbers of loads in a charge.

My invention will be more fully understood from the following description taken in connection with the accompanying drawings which set forth my invention as applied to a blast furnace.

Figure 2:
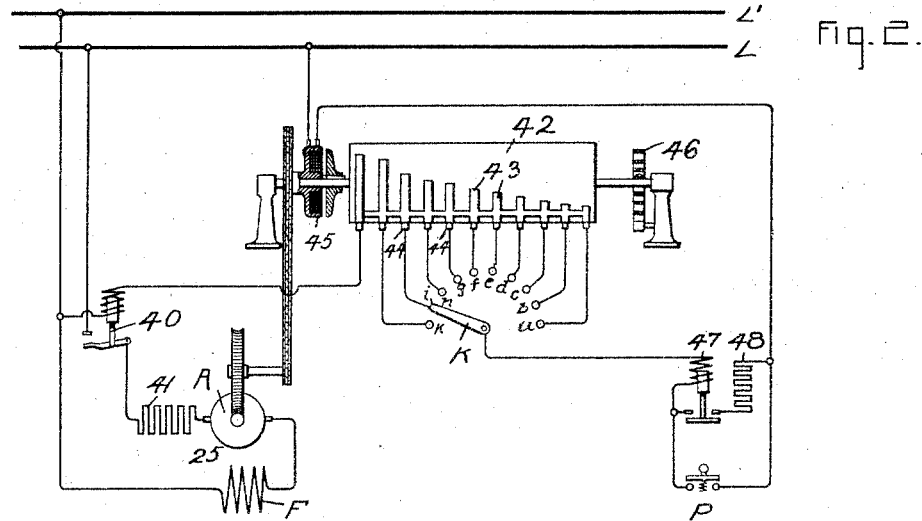
Figure 3:
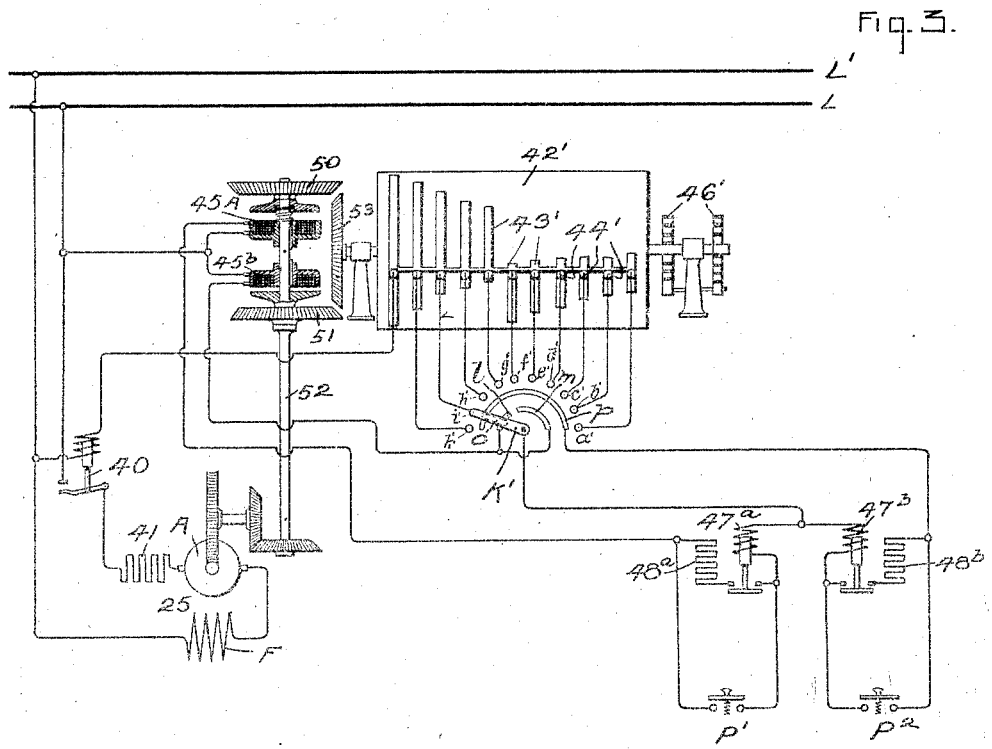
Figure 4:
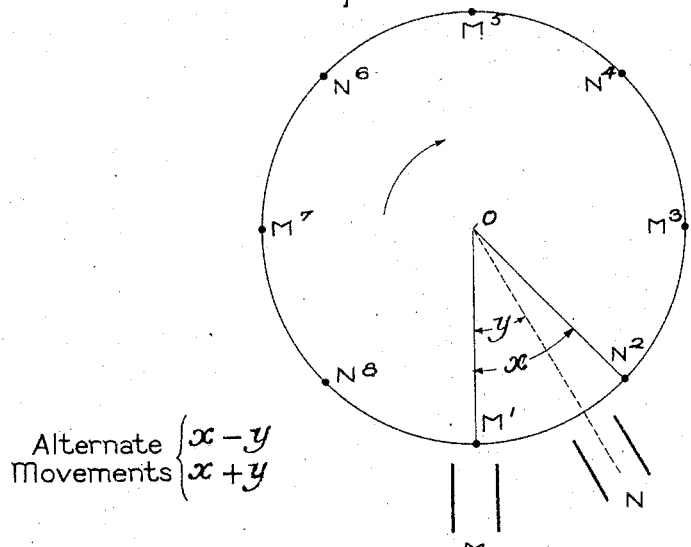
Figure 5:
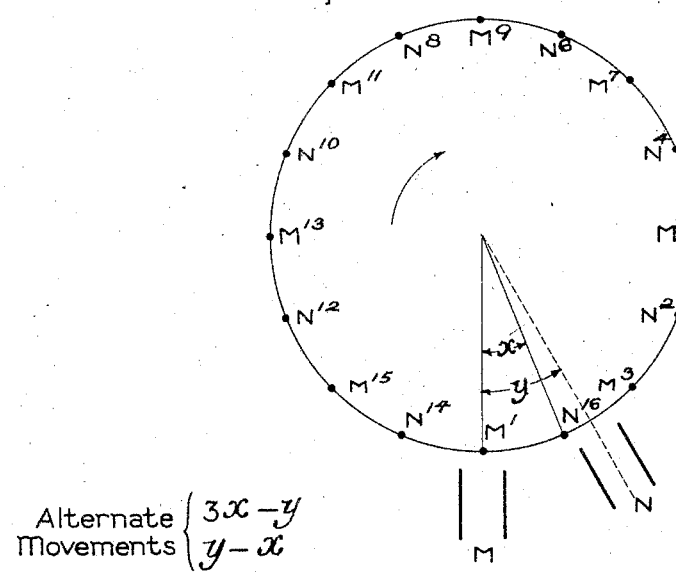

In the drawings Figure 1 is an elevation, partly in section and partly diagrammatic, of the upper part of a blast furnace having my invention applied thereto; Fig. 2 is a diagram of the control system shown in Fig. 1 arranged for use in connection with a single hoist; Fig. 3 is a diagram of my control system adapted for use with two hoists; and Figs. 4 and 5 are diagrams hereinafter referred to in connection with certain formulæ.

Referring to Fig. 1, the upper part of a blast furnace is shown in simple form and in cross-section at the right. Those familiar with blast furnace construction will recognize at 10 the walls of the chamber between the large and small bells. The small bell is shown at 11 hung from a hollow rod 12, through which passes a rod 13 upon the lower end of which is supported the large bell (not shown). The rotating hopper is shown at 14 mounted upon balls 15 which rest in a ball race on the frame 16 in any suitable and well-known manner. Above the hopper 14 is rigidly supported a receiving funnel 17. The track upon which the car of the hoist runs is indicated at 20, and a car 21 is shown in outline. As has been stated, there are often two of these hoists so arranged that as the car of one ascends the car of the other descends. Since the particular construction of these hoists forms no part of my invention, I have deemed it unnecessary to further illustrate them. The motor which rotates the hopper 14 is shown at 25, being geared to the hopper through reduction gearing 26, a counter-shaft 27, beveled gears 28 and 29, pinion 30 and circular rack 31 secured to the hopper. This gearing may be of any suitable kind, that shown being merely illustrative of one form.

The system of control for the motor 25 illustrated in Fig. 1 is intended for use when there is but one hoist, or where there are a plurality of hoists whose tracks unite at the top of the furnace in a single track. This system of control is clearly shown diagrammatically in Fig. 2. Referring particularly to Fig. 2, the armature of the motor 25 is indicated at A, and the field at F, the motor preferably being a series motor although a shunt or compound wound motor may be used if desired. The source of current supply is indicated by the conductors L and L¹ and the electromagnetic switch 40 serves to connect the motor 25 to the source in series with a resistance 41 which is interposed in the circuit in order to cut down the current on starting. Geared to revolve with the motor and the hopper is a limit switch comprising a drum 42 upon which are segments 43 which are engaged by fixed fingers 44. The drum 42 is driven from the motor 25, through reduction gearing and a magnetic clutch 45, which is energized in a manner hereinafter described, and the drum is biased to a certain position by means of a spring 46, or in any other suitable manner. The fingers 44 which engage the segments 43 are connected to a setting switch having contacts $a$, $b$, $c$, $d$, $e$, $f$, $g$, $h$, $i$ and $k$, which may be circularly arranged and engaged by a pivoted arm K. The segments 43 are electrically connected together, and the finger which contacts with the longest one (at the left end of the drum) is connected to one end of the actuating coil of the electromagnetic switch 40, the other end of this coil being connected to the line L¹. The arm K is connected through the actuating coil of a relay 47, a push-button P and the coil of the electromagnetically operated clutch 45 to the line L. The relay 47 when operated closes a circuit through a resistance 48 in shunt to the push-button P. The segments 43 are made of a length proportional to the angle through which the hopper must be rotated between loads for different numbers of loads in a charge. As shown, the segment at the extreme right hand is of a length sufficient to maintain contact with its co-acting finger 44, while the hopper is moved 1/6 of a complete revolution; that is, this segment corresponds to six loads or instalments of material per revolution of the hopper. Similarly, the segments whose fingers are connected respectively to the contacts $b$, $c$, $d$, $e$, $f$, $g$, $h$, $i$ and $k$ correspond respectively to 8, 10, 12, 14, 16, 18, 20, 22 and 24 loads per revolution of the hopper. The length of these segments may be easily calculated and additional segments may be added for other numbers of loads per revolution of the hopper if desired, although in actual practice the number which I have illustrated will probably be sufficient.

The operation of the system shown in Figs. 1 and 2 is obvious. The arm K is placed on that contact $a$ or $b$ or $c$, etc., which corresponds to the number of loads per revolution of the hopper which are to be used in the charge which it is desired to feed to the furnace. After the first hoist load of material has been dumped into the hopper the push-button P, which may be either manually operated or controlled automatically by some part of the hoist, is pressed and a circuit is closed from the line L, through the actuating coil of the electromagnetic clutch 45, push-button P, actuating coil of the relay 47, arm K, one of the contacts $a$ to $k$, the finger 44 connected thereto, the corresponding segment 43 to the segment whose co-acting finger is connected to the actuating coil of the electromagnetic switch 40, thence through this coil to the line L¹. The switch 40 is at once closed thereby connecting the motor 25 to the line, and at the same time the clutch 45 is closed and the relay 47 is operated. The relay 47 completes a circuit through the resistance 48 in shunt to the push-button P thereby holding closed the circuit just traced independently of the push-button P. The operation of the motor 25 revolves the hopper 14 and the drum 42, which operation continues until the finger 44, which is connected to the contact upon which the arm K rests, ceases to engage with its segment. When this occurs the circuit through the operating coil of the clutch 45, the coil of the relay 47 and the coil of the switch 40 is interrupted. The switch 40, therefore opens, stopping the motor, the clutch 45 releases, allowing the spring 46 to return the drum 42 to its initial position, and the relay 47 drops, opening the shunt circuit through the resistance 48 around the push-button P. The hopper 14 has now moved through the proper angle and a second load may be dumped into it. The push-button P may then be closed and the operation repeated. In this way the hopper 14 is revolved step-by-step through an angle sufficient to cause an equal distribution in the hopper of the loads which make up the charge.

Before proceeding to describe the system of control illustrated in Fig. 3, adapted for use where a blast furnace is provided with two hoists for conveying material to the hopper of the furnace, a brief discussion of the problem involved is in order. The end to be accomplished is this: The whole charge, which is to be supplied in instalments at two points alternately on the circumference of the hopper, must be evenly distributed around said hopper; that is, the material must be so dumped into the hopper that the angles between the loads are the same. In order to accomplish this result the hopper must be moved intermittently. Referring to Fig. 4, assuming $o$ to be the axis about which the hopper rotates, said hopper being indicated by the circle, if $x$ be the angle between loads when a certain number of loads of material are to be dumped at uniform angles in the hopper and if $y$ be the angle between the lines which connect the axis $o$ with the two points M and N at the edge of the hopper where the loads are dumped, then the angles through which the hopper should be intermittently moved are alternately $x-y$ and $x+y$. As long as $x$ is greater than $y$ the rotation of the hopper will always be in the same direction and the loads will be distributed in the hopper at an angle from one another equal to $x$ at the points $M^1$, $N^2$, $M^3$, $N^4$, $M^5$, $N^6$, $M^7$ and $N^8$, the letter indicating that the material comes from the hoist M or N, and the exponent indicating the order in which the loads are dumped into the hopper. If, however, $y$ is greater than $x$ the value $x-y$ becomes negative, and in order to dump the loads into the hopper in the order just mentioned it would be necessary to rotate the hopper first in one direction then in the other. Such a mode of operation would present certain difficulties which may be avoided by rotating the hopper intermittently by amounts which are estimated by a different formula which is suitable for use when the number of loads per revolution of the hopper is a multiple of 2, and from where $x=y$ to where $x=\frac{1}{2}y$; that is, where $y=30°$ the following formulæ are applicable up to 36 loads per revolution of the hopper. Referring to Fig. 5 in which $x$, as before, indicates the angle between loads in the hopper, and $y$ the angle between the dumping points at the circumference of the hopper, if the hopper is rotated intermittently alternately by the angles $3x-y$ and $y-x$ the loads will be dumped into the hopper at the angle $x$ from one another, at the points $M^1$, $N^2$, $M^3$, $N^4$, $M^5$, $N^6$, $M^7$, etc.,— in the example given up to $N^{16}$. As before, the letter indicates the hoist from which the load comes, and the exponent the order in which the loads are dumped into the hopper. From Fig. 5 it is obvious that although the adjacent loads are not dumped into the hopper one after another, yet the result is to evenly distribute the loads around the hopper.

I will now describe the system of control shown in Fig. 3. In the system here illustrated it has been assumed that the angle between the lines which connect the points of dumping of the two hoists and the axis of the hopper, in other words, the angle $y$, referred to above, is equal to 30° and the system has been worked out for the same numbers of hoist loads per revolution of the hopper as in the system illustrated in Fig. 2, that is, for 6, 8, 10, 12, 14, 16, 18, 20, 22 and 24 loads. As in Fig. 2, the armature of the motor 25 is indicated at A, and its field at F and a resistance 41 is shown connected in series with the motor in order to cut down the current in starting. As in the previously described system, an electromagnetic switch 40 serves to connect the motor to the source of current L and $L^1$. A drum 42' which is biased to a certain position by oppositely acting springs 46' is geared to rotate with the motor 25 and, therefore, with the hopper 14, said drum being rotated in one direction or the other depending upon which of two magnetic clutches $45^a$ and $45^b$ are operated. As shown, these clutches are arranged to move beveled gears 50 and 51, splined upon a shaft 52 geared to the motor, into engagement with a beveled gear 53 secured to the shaft of the drum 42'. This construction is, however, merely illustrative and specifically forms no part of my invention since many other constructions could obviously be arranged to serve equally well. The drum 42' carries a number of segments 43' electrically connected together and having fingers 44' engaging with them. Each of these fingers 44', except the one at the extreme left of the drum, is connected to a contact $a'$, $b'$, $c'$, $d'$, $e'$, $f'$, $g'$, $h'$, $i'$ or $k'$ over which an arm K' is adapted to move in a manner similar to the arrangement shown in Fig. 2. The finger 44' at the extreme left of the drum 42' engages with the longest segment and is connected to one end of the actuating coil of the switch 40 and serves to maintain at all times a connection between this coil and the segments on the drum 42' as in the system of Fig. 2. The lengths of the segments 43' on each side of the line upon which the fingers 44' rest when the drum is restored to its normal position by means of the springs 46', may be calculated with the aid of the formulæ above mentioned. The actuating coils of the magnetic clutches $45^a$ and $45^b$ are connected in parallel between the line L and the arm K, through the push-buttons $P^1$ and $P^2$, the connection from the clutch $45^a$ to the push-button $P^1$ being through a continuous conductor, while the connection from the clutch $45^b$ to the push-button $P^2$ is through rails $l$ or $m$, a bridging contact $o$, carried by but insulated from the arm K', and a rail $p$. The purpose of the rails $l$, $m$ and $p$ and the coöperating contact $o$ is to cut the push-button $P^2$ out of operation when the contact arm K' is set for 12 loads per revolution, under which condition $x=y$, in the formula as above mentioned, and the hopper must alternately be allowed to remain at rest and be rotated 60°. Under this condition it is desirable that one of the push-buttons be rendered inoperative. As in the system shown in Fig. 2, relays 47ᵃ and 47ᵇ are arranged to complete circuits through resistances 48ᵃ and 48ᵇ in shunt to the push-buttons P¹ and P².

The operation of the system shown in Fig. 3 is very similar to that of the system illustrated in Fig. 2. The arm K' is set at the proper point and the push-buttons P¹ and P² are alternately operated either by hand or automatically by the hoists. The drum 42' is rotated first in one direction and then in the other and regulates the angles through which the hopper is intermittently rotated.

Although I have described my invention as applied to the control of electric motors, I do not intend to limit it in its application to this use, but in the following claims use the term "motor" in the broad sense to include all form of motion producing mechanisms, such as steam engines, gas engines, etc. It is also my intention to cover by my claims all embodiments of my invention which are within their scope.

What I claim as new and desire to secure by Letters Patent of the United States, is:—

1. In combination a rotating hopper, means for delivering material in instalments to said hopper, a motor for rotating said hopper intermittently to effect even distribution of the material therein, and a control system for said motor comprising a starting switch, a limit switch having a plurality of contacts for limiting the rotation of said hopper differently for different numbers of loads per revolution, a driving connection between said limit switch and the hopper mechanism, and a setting switch coöperating with the contacts of said limit switch to regulate the limiting effect of the latter.

2. In combination a rotating hopper, means for delivering material in instalments to said hopper, a motor for rotating said hopper intermittently to effect even distribution of the material therein, and a control system for said motor comprising a starting switch, a limit switch biased to a certain position and having a plurality of contacts for limiting the rotation of said hopper differently for different numbers of loads per revolution, a driving connection between said limit switch and the hopper mechanism including a magnetic clutch closed only while said motor is energized, and a setting switch coöperating with the contacts of said limit switch to regulate the limiting effect of the latter.

3. In combination, a rotary hopper, means for delivering material in instalments to said hopper, a motor for rotating said hopper, a line switch for said motor, and means for closing and opening a control circuit to said line switch comprising a drum arranged to rotate with said hopper, segments of different lengths carried by said drum, stationary fingers coöperating with said segments, a switch for connecting any finger and its segment in said control circuit, and a starting switch for closing said control circuit.

4. In combination a rotary hopper, means for delivering material in instalments to said hopper, a motor for rotating said hopper intermittently to effect even distribution of the material therein, an electrically controlled line switch fo said motor, and means for controlling the closing and opening of said line switch comprising a limit switch having a plurality of contacts closed during different angular movements of said limit switch, a driving connection between said limit switch and the hopper mechanism, and a setting switch coöperating with the contacts of said limit switch for arranging any one of said contacts in the control circuit of the line switch, and a starting switch for closing the control circuit.

5. In combination with a rotating hopper, means for delivering material in instalments from two points alternately to said hopper, a motor for rotating said hopper intermittently to effect even distribution of the material therein, and a control system for said motor comprising two starting switches, a limit switch having a plurality of contacts closed during different angular movements of said limit switch, a driving connection between said limit switch and the hopper mechanism, and a setting switch coöperating with the contacts of said limit switch and with the starting switches to regulate the limiting effect of the limit switch according to the number of instalments of material delivered to said hopper per revolution.

6. In combination, a rotary hopper, means for delivering material in instalments from two points alternately to said hopper, a motor for rotating said hopper, an electrically controlled line switch for said motor, and means for closing and opening a control circuit to said line switch comprising a drum, segments of different lengths carried by said drum, stationary fingers coöperating with said segments, a switch for connecting any finger and its segment in said control circuit, a reversing driving connection between said drum and the hopper mechanism comprising two clutches, and means for closing said control circuit and either one of said clutches.

7. In combination a rotary hopper, means for delivering material in instalments from two points alternately to said hopper, a motor for rotating said hopper intermittently, an electrically controlled line switch for said motor, and means for controlling the control circuit to said line switch comprising a limit switch biased to a certain position and having a plurality of contacts closed during different angles of rotation of said switch, a driving connection between said limit switch and the hopper mechanism including magnetic clutches which when one or the other is closed cause rotation of the limit switch in opposite directions, a setting switch for connecting any set of contacts on the limit switch in the control circuit, and two starting switches one of which closes the control circuit through one clutch and the other of which closes the control circuit through the other clutch.

In witness whereof, I have hereunto set my hand this eighth day of February, 1908.

WILHELM NAUMANN.

Witnesses:
JULIUS RUMLAND,
KARL KRICKEBEN.